US006937367B2

(12) United States Patent  
Yamaguchi

(10) Patent No.: US 6,937,367 B2
(45) Date of Patent: Aug. 30, 2005

(54) DOCUMENT READING APPARATUS WHICH PREVENTS A DISCREPANCY BETWEEN THE READING RESULTS OBTAINED IN DIFFERENT READING MODES

(75) Inventor: Ryusuke Yamaguchi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 772 days.

(21) Appl. No.: 09/888,482

(22) Filed: Jun. 25, 2001

(65) Prior Publication Data

US 2002/0054379 A1 May 9, 2002

(30) Foreign Application Priority Data

Jun. 27, 2000 (JP) .......................................... 2000-192892

(51) Int. Cl.$^7$ ................................................. H04N 1/04
(52) U.S. Cl. ........................ 358/474; 358/450; 358/498; 358/472; 382/282; 271/3.05; 271/186
(58) Field of Search ................................. 358/498, 474, 358/497, 472, 449, 488, 451–453; 382/282, 291

(56) References Cited

U.S. PATENT DOCUMENTS 6,097,852 A * 8/2000 Yamamoto .................. 382/282
6,650,441 B1 * 11/2003 Horigome et al. .......... 358/474

* cited by examiner

*Primary Examiner*—Edward Coles
*Assistant Examiner*—Heather D. Gibbs
(74) *Attorney, Agent, or Firm*—Frishauf, Holtz, Goodman & Chick, P.C.

(57) ABSTRACT

The digital copier comprises a document table for supporting a document, a document tray for receiving documents, a line sensor for reading an image from each document in units of lines parallel to a main scanning direction, a sensor transporter for transporting the sensor to scan the document on the table from one reading surface edge in the sub-scanning direction during the table-document reading mode, a document feeder for feeding each document received in the tray such that the document is scanned from another reading surface edge in the sub-scanning direction during the feeder-document reading mode, and a processing section for processing a reading result of the sensor. Particularly, the processing section has a controller for controlling the read start timing to compensate for a read range which may deviate with respect to an identical effective reading area of each document between the reading modes.

40 Claims, 3 Drawing Sheets

(a)

(b)

(c)

DOCUMENT READING APPARATUS WHICH PREVENTS A DISCREPANCY BETWEEN THE READING RESULTS OBTAINED IN DIFFERENT READING MODES

CROSS-REFERENCE TO RELATED APPLICATIONS

This application is based upon and claims the benefit of priority from the prior Japanese Patent Application No. 2000-192892, filed Jun. 27, 2000, the entire contents of which are incorporated herein by reference.

BACKGROUND OF THE INVENTION

1. Field of the Invention

The present invention relates to a document reading apparatus capable of selecting a reading mode for the image of a document placed on a document table and read by a line sensor moving relatively to the document, or a reading mode for the image of a document fed relatively to a fixed line sensor and read by the line sensor.

2. Description of the Related Art

FIG. 4 schematically shows the arrangement of a conventional reading unit serving as part of a digital copier. The reading unit includes a transparent document table 2 for supporting a document D1 not to be moved for reading, a carriage 3 disposed below the document table 3, and a line sensor 1 mounted on the carriage 3. The carriage 3 is movable in a sub-scanning direction perpendicular to a main scanning direction, and the line sensor 1 is mounted parallel to the main scanning direction. In the table-document reading mode, the line sensor 1 reads an image from the document D1 on the document table 2 while moving in the sub-scanning direction together with the carriage 3. The reading unit further includes a document tray 5 for receiving a stack of documents D2 to be moved for reading, a feed roller 4 for feeding each of the documents D2 from the document tray 5, and a discharge tray 6 for receiving the document D2 discharged by the feed roller 4. In the feeder-document reading mode, the line sensor 1 is set at a reference reading position and reads an image of the document D2 fed by the feed roller 4 and passing through the sensor 1.

In such a configuration, the document D1 is placed on the document table 2 with its reading surface faced down, whereas the document D2 is placed on the document tray 5 with its reading surface faced up. For this reason, if the document D1 is placed with its top edge oriented to the far side of the document table 2 in FIG. 4, then the right edge of the reading surface is located at a position close to the line sensor 1 and the left edge thereof is located at a position remote from the line sensor 1. In contrast, if the document D2 is placed with its top edge oriented to the far side of the document tray 5 in FIG. 4, then the left edge of the reading surface is located at a position close to the line sensor 1 and the right edge thereof is located at a position remote from the line sensor 1. That is, reading of an image starts from the right edge of the reading surface in the table-document reading mode and from the left edge of the reading surface in the feeder-document reading mode.

Such a difference in the reading start edge causes a problem in the process of enlarging or reducing the size of an image read from part of the document. To be more specific, assume that the copy magnification is set to 200% to print an image of the area located on the upper right-hand side of the document shown in (a) of FIG. 5 on a sheet having the same size as the document. When the document is placed on the document table 2 as a document D1 not moved for reading, the image of the area located on the upper right-hand side of the document D1 is converted into image data to be printed as shown in (b) of FIG. 5. On the other hand, if the document is placed on the document tray 5 as a document D2 moved for reading, the image of the area located on the upper left-hand side of the document D2 is converted into image data to be printed as shown in (c) of FIG. 5.

To cope with the problem, correction of the read range is required in the feeder-document reading mode. However, this increases the burden on the user. Instead, an image of the document D2 may be read for the entire length in the sub-scanning direction to carry out an image processing for the area located on the upper right-hand side of the document D1. However, the processing time will be increased due to the image data read from an unnecessary part of the document D2.

BRIEF SUMMARY OF THE INVENTION

It is therefore an object of the present invention to provide a document reading apparatus which prevents a discrepancy between the reading results obtained in different reading modes.

According to an aspect of the present invention, there is provided a document reading apparatus which comprises a document table for supporting a single document, a document tray for receiving a stack of documents, a line sensor for reading an image from each of the documents in units of lines parallel to a main scanning direction, a sensor transporter for transporting the line sensor to scan the document on the document table from one reading surface edge in the sub-scanning direction during a first reading mode, a document feeder for feeding each document received in the document tray such that the document is scanned from another reading surface edge opposite to the one reading surface edge of the document on the document table in the sub-scanning direction during a second reading mode, and a processing section for processing a reading result of the line sensor as image data, wherein the processing section has a controller for controlling a read start timing to compensate for a read range which may positionally deviate with respect to an identical effective reading area of each document between the first and second reading modes.

With the document reading apparatus, the controller controls the read start timing to compensate for a read range which may positionally deviate with respect to an identical effective reading area of each document between the first and second reading modes. Thus, the same reading results can be obtained, regardless of the difference between the first and second reading modes. In this case, since processing of image data corresponding to an image read from an unnecessary part of the document is not required, image data corresponding to the effective reading area can be quickly processed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 4:
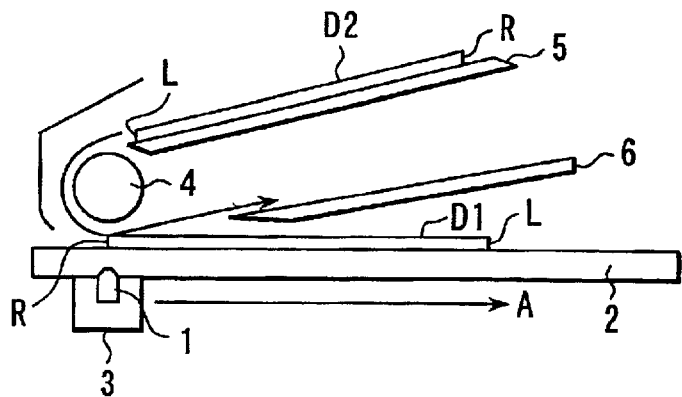
FIG. 4 is a schematic view showing the arrangement of a conventional reading unit capable of selecting a table-document reading mode for the image of a document placed on a document table or a feeder-document reading mode for the image of a document fed by a document feeder.

A digital copier according to one embodiment of the present invention will be described with reference to the accompanying drawings. In the drawings, the same reference numerals are used to denote corresponding parts to those in FIG. 4.

Figure 1:
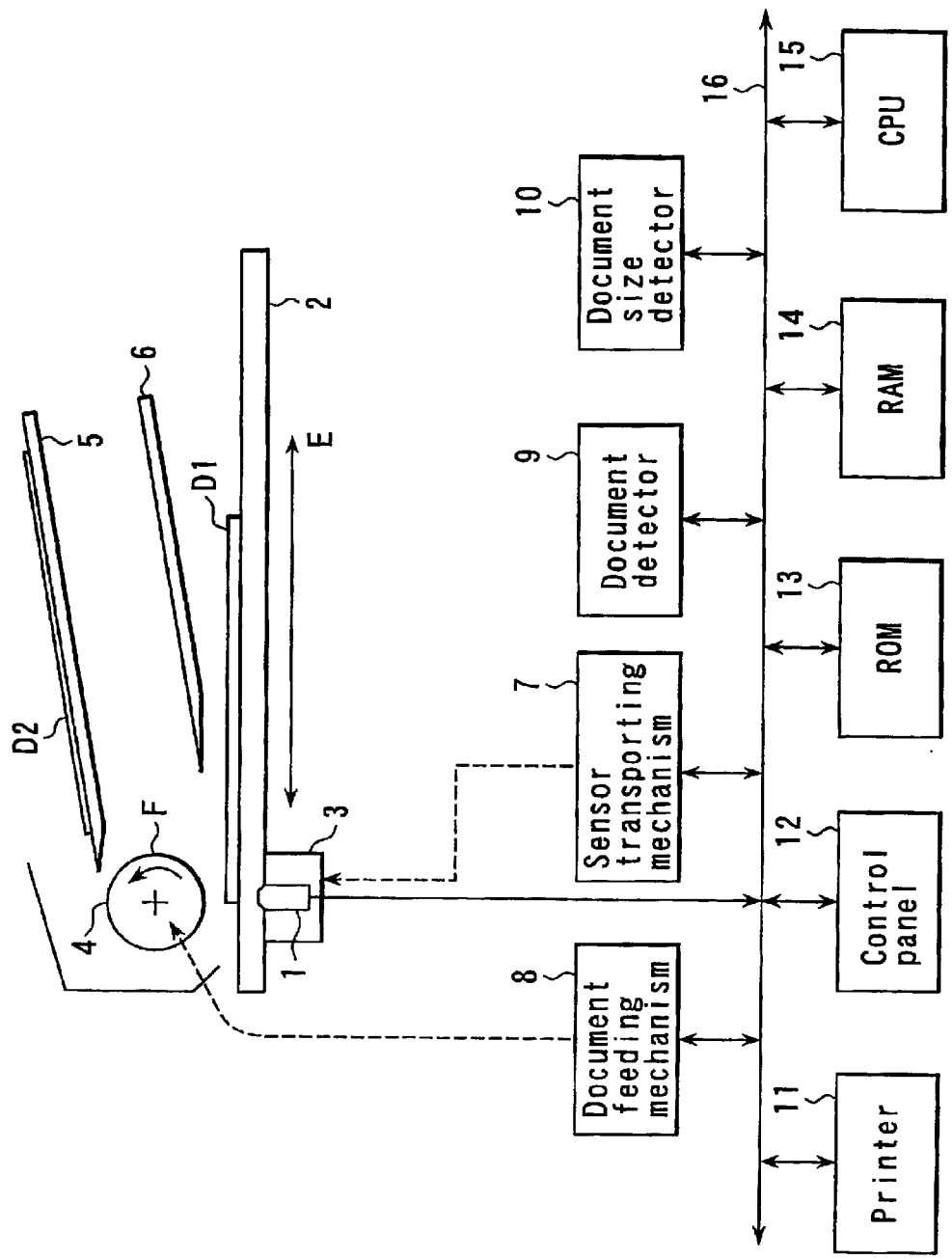
FIG. 1 is a schematic view showing the arrangement of a digital copier according to one embodiment of the present invention.

FIG. 1 schematically shows the arrangement of the digital copier. The digital copier includes a line sensor 1, a transparent document table 2, a carriage 3, a feed roller 4, a document tray 5, a discharge tray 6, a sensor transporting mechanism 7, a document feeding mechanism 8, a document detector 9, a document size detector 10, a printer 11, an operation panel 12, a ROM 13, a RAM 14, and a CPU 15. The line sensor 1, the sensor transporting mechanism 7, the document feeding mechanism 8, the document detector 9, the document size detector 10, the printer 11, the operation panel 12, the ROM 13, the RAM 14 and the CPU 15 are interconnected by a bus 16.

The document table 2 is made, for example, of a glass plate, and supports a single document D1 placed with its reading surface faced down. The document tray 5 is disposed above the document table 2, and receives a stack of documents D2 placed with their reading surface faced up. The line sensor 1 is mounted on the carriage 3 in parallel with a main scanning direction, and disposed below the document table 2 to read an image from the document D1 via the transparent document table 2 in units of lines parallel to the main scanning direction. The span of the line sensor 1 is determined to be slightly longer than the longitudinal dimension of an A4-size document, for example.

The sensor transporting mechanism 7 and the carriage 3 form a sensor transporter which transports the line sensor 1 to scan the document D1 on the document table 2 from the right reading surface edge in a sub-scanning direction perpendicular to the main scanning direction during the table-document reading mode. The carriage 3 is initially set at a reference reading position located near an end of the document table 2, and driven by the sensor transporting mechanism 7. The sensor transporting mechanism 7 includes a motor and gears, and reciprocally transports the carriage 3 along with the line sensor 1 from the reference reading position as indicated by the arrow E shown FIG. 1.

The document feeding mechanism 8 and the feed roller 4 form a document feeder which feeds each of the documents D2 received by the document tray 5 such that the document D2 is scanned by the line sensor 1 from another reading surface edge opposite to the one reading surface edge of the document D1 on the document table 2 in the sub-scanning direction during the feeder-document reading mode. The feed roller 4 is disposed above the line sensor 1 set at the reference reading position, and driven by the document feeding mechanism 8. The document feeding mechanism 8 includes a motor and gears, and rotates the feed roller 4 to wind up the document D2 on its top side and feed the document D2 picked from the document tray 5 toward the discharge tray 6 as indicated by the arrow F shown in FIG. 1. The discharge tray 6 is disposed between the document table 2 and the document tray 5, and receives the document D2 discharged after passing the line sensor 1. The document detector 9 detects the presence of the document D1 placed on the document table 2. The document size detector 10 detects the presence of the document D2 placed on the document tray 5, along with the size of the document D2.

The ROM 13, the RAM 14 and the CPU 15 form a processing section that processes an image read by the line sensor 1 as image data. The ROM 13 stores fixed data such as a control program of the CPU 15, various setting values, and the like. The RAM 14 temporarily stores different kinds of variable data input to and output from the CPU 15. The CPU 15 performs a control processing of controlling the whole operation of the components of the digital copier in accordance with the control program stored in the ROM 13. The printer 11 prints an image on a copy sheet on the basis of the image data obtained by the processing section described above. The operation panel 12 includes key switches, a display, etc., accepts user's commands to the CPU 15 entered by key-in operations, and outputs information to be notified to the user.

The processing section further performs a control of the read start timing to compensate for a read range which may positionally deviate with respect to an identical effective reading area of each of the documents D1 and D2 between the table-document reading mode and the feeder-document reading mode. More specifically, the processing section allows an idle-feeding of the document D2, which starts facing the line sensor 1 from the left reading surface edge, to read an image from an effective reading area neighboring the right reading surface edge in a copying process of document D2, and converts an output signal of the line sensor 1 to image data at a timing where the effective reading area of the document 2 reaches the line sensor 1. Note that the idle-feeding distance for the document D2 is determined based on the size of the document D2, the size of the copy sheet, and the copy magnification, and varies with a range of the effective reading area to be read in the document D2.

Figure 2:
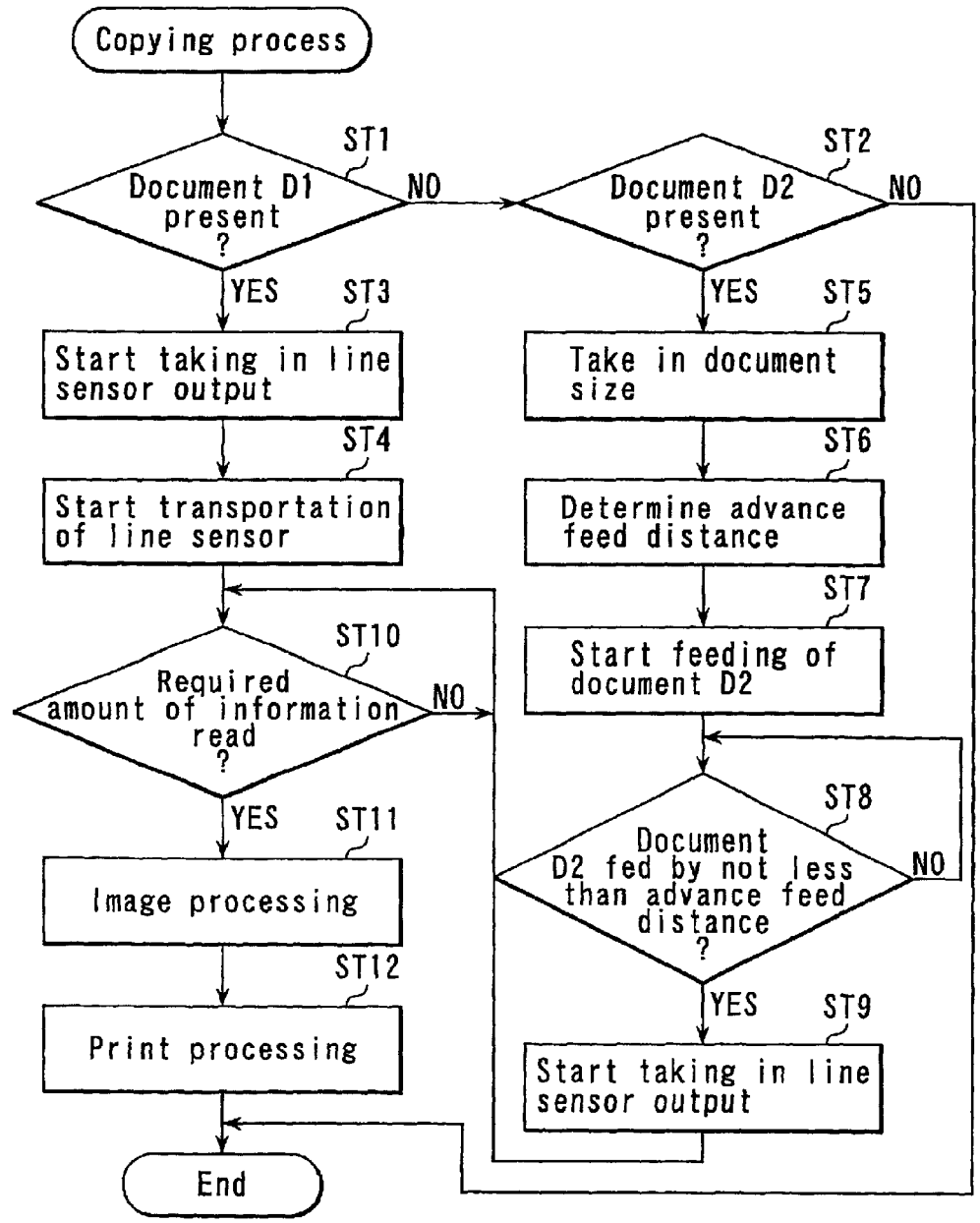
FIG. 2 is a flowchart showing a copying process of the digital copier shown in FIG. 1.

FIG. 2 shows a copy process of the digital copier. The copy process starts in response to a start command entered when the user depresses a start key on the operation panel 12.

Upon start of the copy process, the CPU 15 checks in step ST1 whether the document detector 9 has detected a presence of the document D1, and checks in step ST2 whether the document size detector 10 had detected a presence of the document D2. When neither the documents D1 nor D2 is detected, the CPU 15 determines that no copy is required and terminates the copy process.

When the presence of the document D1 is detected, it is determined that the table-document reading mode is set. The CPU 15 starts capturing of the output of the line sensor 1 in step ST3 and activates the sensor transporting mechanism 7 in step ST4 to start transportation of the line sensor 1. The output of the line sensor 1 is read as image data and stored in the RAM 14. In the table-document reading mode, the document D1 is placed on the document table 2 such that the right reading surface edge is aligned with the line sensor 1 set at the reference reading position. Thus, reading of a document image starts from the right reading surface edge.

When the document D2 is detected instead of the document D1, it is determined that the feeder-document reading mode is set. In step ST5, the CPU 15 takes in the size of the document D2 obtained by the document size detector 10. Then, in step ST6, the CPU 15 determines an advance feed distance with reference to an idle-feeding distance specified based on the document size, the copy sheet size and the copy magnification. The copy sheet size and the copy magnification are entered from the operation panel 12 according to the user's key-in operation made before start of the copy process. Here, the idle-feeding distance of the document D2 refers to the one by which the document D2 is fed without being read by the line sensor 1 facing the document D2, and corresponds to the distance between the left reading surface edge and the effective reading area. In addition, the advance feed distance corresponds to the sum of the idle-feeding distance and the length of the path of the document D2 fed from the document tray 5 to the line sensor 1.

The idle-feeding distance L is determined as follows:

$$L=(La \times M - Lb)/M$$

where La: the width of a document D2 (the sub-scanning directional dimension of a document D2), Lb: the width of a copy sheet (the sub-scanning directional dimension of an image to be printed), and M: the sub-scanning directional copy magnification.

In the case where the value of $(La \times M - Lb)/M$ is negative, the idle-feeding length L is set to be "0".

After the advance feed distance has been determined in this manner, the CPU 15 activates the document feeding mechanism 8 to start feeding of the document D2 in step ST7. Thereafter, the CPU 15 repeatedly checks whether the document D2 is fed by not less than the advance feed distance in step ST8. When the document D2 has been fed by the advance feed distance, the effective reading area of the document D2 faces the line sensor 1. At this time, the CPU 15 executes step ST9 to start capturing of the output of the line sensor 1. The output of the line sensor 1 is captured as image data while document D2 is fed, and stored in the RAM 14.

Step ST10 is executed after each of steps ST4 and ST9 to check whether a required amount of information has been obtained from the line sensor 1. The required amount of information is the amount of image data required for an image to be printed onto a copy sheet and depends on the copy sheet size and the copy magnification. When the required information is obtained, the CPU 15 performs necessary image processing on the image data to enlarge or reduce the read image in step ST11, and then allows the printer 11 to print the image according to a result of the image processing in step ST12. The CPU 15 terminates the copy process after completion of printing.

Figure 3:
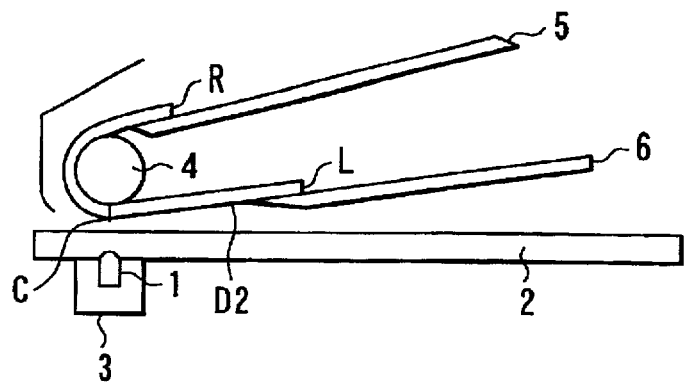
FIG. 3 shows a document position at the read start timing which is determined to enlarge an image read from an effective reading area of a document fed by a document feeder shown in FIG. 1 and to print the image on a copy sheet having the same size as the document.

For example, if the copy process is performed to print the image of a document on a copy sheet of the same size as the document at the copy magnification of 200%, the document D2 is fed over the line sensor 1 by a distance corresponding to one-half of its width in the sub-scanning direction so as to start reading of an image therefrom at a timing when the center line C of the document D2 in the sub-scanning direction has reached the reference reading position of the line sensor 1, as shown in FIG. 3.

Figure 5:
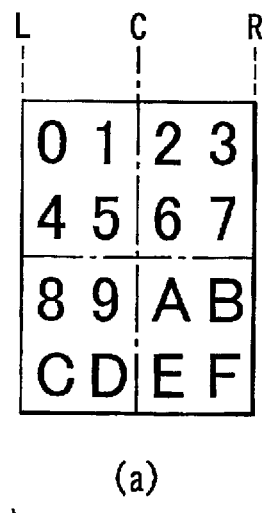
FIG. 5 is a view for explaining a problem caused in a process of enlarging or reducing the size of an image read from an effective reading area of the document by the reading unit shown in FIG. 4.
Figure 5:
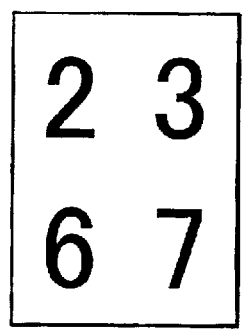
Figure 5:
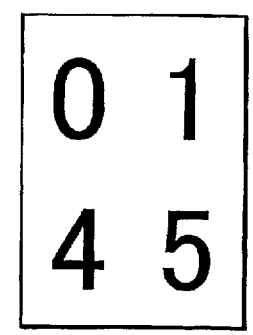

As a result, if the document D2 is one as depicted in (a) of FIG. 5, an image is read in the range between the center line C and the right reading surface edge in the same manner as the document D1, so as to obtain image data to be printed as shown in (b) of FIG. 5.

With the digital copier of the embodiment described above, the processing section performs a control of the read start timing to compensate for a read range which may deviate with respect to an identical effective reading area of each document between the table-document reading mode and the feeder-document reading mode. Thus, the same reading results can be obtained, regardless of the difference between these reading modes. In this case, since processing of image data corresponding to an image read from an unnecessary part of the document is not required, image data corresponding to the effective reading area can be quickly processed. Accordingly, the same copying result can be obtained in each of the reading modes without increasing the load on the user.

With the above-mentioned structure, since unnecessary processing of image data can be omitted, the total processing time can be reduced even in the case where the whole image of the document is printed on a copy sheet larger than the document.

In the above-described embodiment, the document size detector 10 detects the size of a document. Instead, the size of the document can be entered from the operation panel 12 according to the user's key-in operation, in the same manner as the copy sheet size and the copy magnification. Further, the idle-feeding distance and the advance feed distance may also be entered from the operation panel 12 according to the user's key-in operation. Moreover, it is not necessary to calculate the idle-feeding distance and the advance feed distance each time the copy process is performed. For example, it is possible to provide a data table in which combinations of document size, copy sheet size and copy magnification are mapped into previously determined idle-feeding distances or advance feed distances, so as to select an appropriate idle-feeding distance or advance feed distance for each copy process.

In addition, the digital copier of the above-mentioned embodiment is used for reading and printing the image of a document. This digital copier can be modified to a stand-alone document reading apparatus if the printer is eliminated therefrom. This document reading apparatus may be incorporated into an image processing device such as a facsimile.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document reading apparatus comprising:
   a document table for supporting a single document;
   a document tray for receiving a stack of documents;
   a line sensor for reading an image from each of the documents in units of lines parallel to a main scanning direction;

a sensor transporter for transporting the line sensor to scan the document on said document table from one reading surface edge in the sub-scanning direction during a first reading mode;

a document feeder for feeding each document received in said document tray such that the document is scanned from another reading surface edge opposite to the one reading surface edge of the document on said document table in the sub-scanning direction during a second reading mode; and a processing section for processing a reading result of said line sensor as image data;

wherein said processing section has a controller for controlling a read start timing to compensate for a read range which may positionally deviate with respect to an identical effective reading area of each document between the first and second reading modes, and wherein said controller is configured such that the read start timing is set in the first reading mode at a timing that transportation of said line sensor is started from a reference reading position where a roading surface edge of the document faces said line sensor, and is set in the second reading mode at a timing that the effective reading area reaches said line sensor located at the reference reading position.

2. A document reading apparatus according to claim 1, wherein;

said document table is transparent;

said line sensor is disposed below said document table to face a document placed on said document table with a reading surface thereof faced down; and said document feeder is configured to feed a document received in said document tray with a reading surface thereof faced up such that the reading surface faces to said line sensor.

3. A document reading apparatus according to claim 1, wherein said controller is configured to confirm that the document is fed over said line sensor by an idle-feeding distance, to obtain the read start timing in the second reading mode.

4. A document reading apparatus according to claim 3, wherein said controller is configured to calculate said idle-feeding distance based on a sub-scanning directional dimension of the document, a sub-scanning directional dimension of an image to be produced according to the image data, and sub-scanning directional magnification.

5. A document reading apparatus according to claim 4, wherein said controller includes a document size detector which detects the sub-scanning directional dimension of the document received in said document tray.

6. A document reading apparatus according to claim 5, wherein said controller further includes an operation panel which enters the sub-scanning directional dimension of an image to be produced according to the image data, and the sub-scanning directional magnification.

7. A document reading apparatus according to claim 4, wherein controller includes an operation panel which enters the sub-scanning directional dimension of the document received in said document tray.

8. A document reading apparatus according to claim 7, wherein said operation panel is configured to further enter the sub-scanning directional dimension of an image to be produced according to the image data, and the sub-scanning directional magnification.

9. A document reading apparatus according to claim 4, wherein the controller includes an operation panel which enters the idle-feeding distance.

10. A document reading apparatus comprising:

a document table which supports a single document;

a document tray which receives a stack of documents;

a line sensor which reads an image from each of the documents in units of lines parallel to a main scanning direction;

a sensor transporter which transports the line sensor to scan the document on said document table from one reading surface edge in the sub-scanning direction during a first reading mode;

a document feeder which feeds each document received in said document tray such that the document is scanned from another reading surface edge opposite to the one reading surface edge of the document on said document table in the sub-scanning direction during a second reading mode;

a processing section which processes a reading result of said line sensor as image data; and a controller which controls a read start timing to compensate for a read range which may positionally deviate with respect to an identical effective reading area of each document between the first and second reacting modes, wherein said controller is configured such that the read start timing is set in the first reading mode at a timing that transportation of said line sensor is started from a reference reading position where a reading surface edge of the document faces said line sensor, and is set in the second reading mode at a timing that the effective reading area reaches said line sensor located at the reference reading position.

11. A document reading apparatus according to claim 10, wherein:

said document table is transparent;

said line sensor is disposed below said document table to face a document placed on said document table with a reading surface thereof faced down; and said document feeder is configured to feed a document received in said document tray with a reading surface thereof faced up such that the reading surface faces to said line sensor.

12. A document reading apparatus according to claim 10, wherein said controller is configured to check that the document is fed over said line sensor by an idle feeding distance, to obtain the read start timing in the second reading mode.

13. A document reading apparatus according to claim 12, wherein said controller is configured to calculate said idle-feeding distance based on a sub-scanning directional dimension of the document, a sub-scanning directional dimension of an image to be produced according to the image data, and sub-scanning directional magnification.

14. A document reading apparatus according to claim 13, wherein said controller includes a document size detector which detects the sub-scanning directional dimension of the document received in said document tray.

15. A document reading apparatus according to claim 14, wherein said controller further includes an operation panel which enters the sub-scanning directional dimension of an image to be produced according to the image data, and the sub-scanning directional magnification.

16. A document reading apparatus according to claim 13, wherein said controller includes an operation panel which enters the sub-scanning directional dimension of the document received an said document tray.

17. A document reading apparatus according to claim 16, wherein said operation panel is configured to further enter the sub-scanning directional dimension of an image to be produced according to the image data, and the sub-scanning directional magnification.

18. A document reading apparatus according to claim 13, wherein said controller includes an operation panel which enters the idle feeding distance.

19. A controlling method in a document reading apparatus comprising the steps of:
    checking a presence of a document on a document table;
    checking e presence of a document in a document tray;
    reading an image from the document in units of lines parallel to a main scanning direction by a line sensor;
    setting a first reading mode when the document is present on the document table and moving a sensor transporter which transports the line sensor to scan the document on said document table from one reading surface edge in the sub-scanning direction during the first reading mode;
    setting a second reading mode when the document is present in the document tray and feeding the document received in the document tray such that the document is scanned from another reading surface edge opposite to the one reading surface edge of the document on said document table in the sub-scanning direction during the second reading mode;
    controlling a read start timing to compensate for a read range which may positionally deviate with respect to an identical effective reading area of each document between the first and second reading modes; and
    processing a reading result of said line sensor as image data,
    wherein setting the read start timing in the first reading mode at a timing that transportation of said line sensor is started from a reference reading position where a reading surface edge of the document faces said line sensor; and
    wherein setting the read start timing in the second reading mode at a timing that the effective reading area reaches said line sensor located at the reference reading position.

20. A controlling method according to claim 19, wherein checking that the document is fed over said line sensor by an idle feeding distance is performed to obtain the read start timing in the second reading mode.

21. A controlling method according to claim 20 further comprising the step of:
    calculating said idle-feeding distance based on a sub-scanning directional dimension of the document, a sub-scanning directional dimension of an image to be produced according to the image data, and sub-scanning directional magnification.

22. A controlling method according to claim 21 further comprising the step of:
    detecting the sub-scanning directional dimension of the document received in said document tray by a document size detector.

23. A controlling method according to claim 22 further comprising the step of:
    entering the sub-scanning directional dimension of an image to be produced according to the image data, and the sub-scanning directional magnification from an operation panel.

24. A controlling method according to claim 21 further comprising the step of:
    entering the sub-scanning directional dimension of the document received in said document tray from an operation panel.

25. A controlling method according to claim 24 further comprising the step of:
    entering the sub-scanning directional dimension of an image to be produced according to the image data, and the sub-scanning directional magnification from said operation panel.

26. A controlling method according to claim 21 further comprising the step of:
    entering the idle feeding distance from an operation panel.

27. A document reading apparatus comprising;
    a document table for supporting a single document;
    a document tray for receiving a stack of documents;
    a document feeder for feeding each document of the stack of documents received in said document tray;
    a sensor for reading an image of the document on the document table from one reading surface edge of the document in a first reading mode and an image of the document fed by said document feeder from another reading surface edge of the document opposite to the one reading surface edge in a second reading mode;
    a setting section for setting magnification to determine a part of the document whose image is enlarged; and
    a processing section for capturing an output signal from said sensor to convert the output signal into image data,
    wherein said processing section is configured to control a start timing of capture according to a distance between each of the one reading surface edge and the another reading surface edge and the part of the document.

28. A document reading apparatus according to claim 27, wherein said distance is an idle-feeding distance in which the document is fed without conversion of the output signal from said sensor into image data, and is determined based on the size of a copy sheet in addition to the magnification.

29. A document reading apparatus according to claim 28 wherein said idle-feeding distance L is give by the equation:

$$L=(La \times M-Lb)/M$$

where L is the size of the document as measured in a scanning direction, Lb is the size of the copy sheet as measured in the scanning direction, and M is the magnification determined with respect to the scanning direction.

30. A document reading apparatus according to claim 29, wherein said processing section is configured to start capture of the output signal from said sensor when the document is fed over said sensor by the idle-feeding distance in the second reading mode.

31. A document reading apparatus according to claim 30, wherein said setting section includes a document size detector which detects the size of the document received in said document tray.

32. A document reading apparatus according to claim 30, wherein said setting section includes an operation panel which enters the size of the document received in said document tray.

33. A document reading apparatus according to claim 27, wherein:
    said document table is transparent;
    said sensor is disposed below said document table to face a document placed on said document, table with a reading surface thereof faced down; and
    said document feeder is configured to feed a document received in said document tray with a reading surface thereof faced up such that the reading surface faces said sensor.

34. A control method in a document reading apparatus which includes a document table for supporting a single document, a document tray for receiving a stack of documents, a document feeder for feeding each document of the stack of documents received in said document tray, and a sensor for reading an image of the document on the document table from one reading surface edge of the document in a first reading mode and an image of the document fed by said document feeder from another reading surface edge of the document opposite to the one reading surface edge in a second reading mode, said method comprising;

- setting magnification to determine a part of the document whose image is enlarged;
- capturing an output signal from said sensor to convert the output signal into image data; and
- controlling a start timing of capture according to a distance between each of the one reading surface edge and the other reading surface edge and the part of the document.

35. A control method according to claim 34, wherein said distance is an idle-feeding distance in which the document is fed without conversion of the output signal from said sensor, and is determined based on the size of a copy sheet in addition to the magnification.

36. A control method according to claim 35, wherein said idle-feeding distance L is given by the equation:

$$L = (La \times M - Lb)/M$$

where La is the size of the document as measured in a scanning direction, Lb is the size of the copy sheet as measured in the scanning direction, and N is the magnification determined with respect to the scanning direction.

37. A control method according to claim 36, wherein capture of the output signal from said sensor starts when the document is fed over said sensor by the idle-feeding distance in the second reading mode.

38. A control method according to claim 37, further comprising detecting the size of the document received in said document tray by a document size detector.

39. A control method according to claim 37, further comprising entering the size of the document received in said document tray from an operation panel.

40. A control method according to claim 34, wherein:

said document table is transparent;

said sensor is disposed below said document table to face a document placed on said document table with a reading surface thereof faced down; and said document feeder is configured to feed a document received in said document tray with a reading surface thereof faced up such that the reading surface faces said sensor.

* * * * *